United States Patent [19]

Edmark, III

[11] Patent Number: 5,440,325
[45] Date of Patent: Aug. 8, 1995

[54] INTERFACE SYSTEM FOR USE WITH MICROPROCESSOR BASED CONTROL SYSTEMS AND METHOD THEREFOR

[76] Inventor: Karl W. Edmark, III, 14806 N. 74 St., Scottsdale, Ariz. 85260

[21] Appl. No.: 363,962

[22] Filed: Dec. 22, 1994

Related U.S. Application Data

[63] Continuation of Ser. No. 161,582, Dec. 6, 1993, abandoned.

[51] Int. Cl.$^6$ .............................................. G09G 3/02
[52] U.S. Cl. ................................. 345/145; 273/438; 345/146; 345/184
[58] Field of Search ............... 345/145, 146, 184, 160, 345/162, 157; 273/148 B, 438

[56] References Cited

U.S. PATENT DOCUMENTS

| | | | |
|---|---|---|---|
| 4,647,915 | 3/1987 | Shank et al. | 345/184 X |
| 4,695,711 | 9/1987 | McGeorge | 345/184 X |
| 4,763,116 | 8/1988 | Eichholz | 345/184 |
| 4,764,763 | 8/1988 | Wickstead et al. | 345/184 X |
| 4,918,293 | 4/1990 | McGeorge | 345/184 X |

*Primary Examiner*—Ulysses Weldon
*Attorney, Agent, or Firm*—Harry M. Weiss

[57] ABSTRACT

An interface system and a method therefor are disclosed for cooperating with a microprocessor based control system that presents at least one of a plurality of options for selection on a display. The system provides a first and a second rotatable dial each of which provide at least one of a plurality of inputs to the microprocessor controlled display. The combination of inputs from the first dial and the second dial define one or more menulike options that a user can select from the display via a selection push button. A second push button is provided to enable the user to reject or step out of a menu option. This interface system, unlike keyboards and mouses, is particularly compact and rugged. Consequently, this interface system is exceptionally well suited for interacting with a microprocessor based control system in an industrial environment or any other type of harsh operating environment.

4 Claims, 2 Drawing Sheets

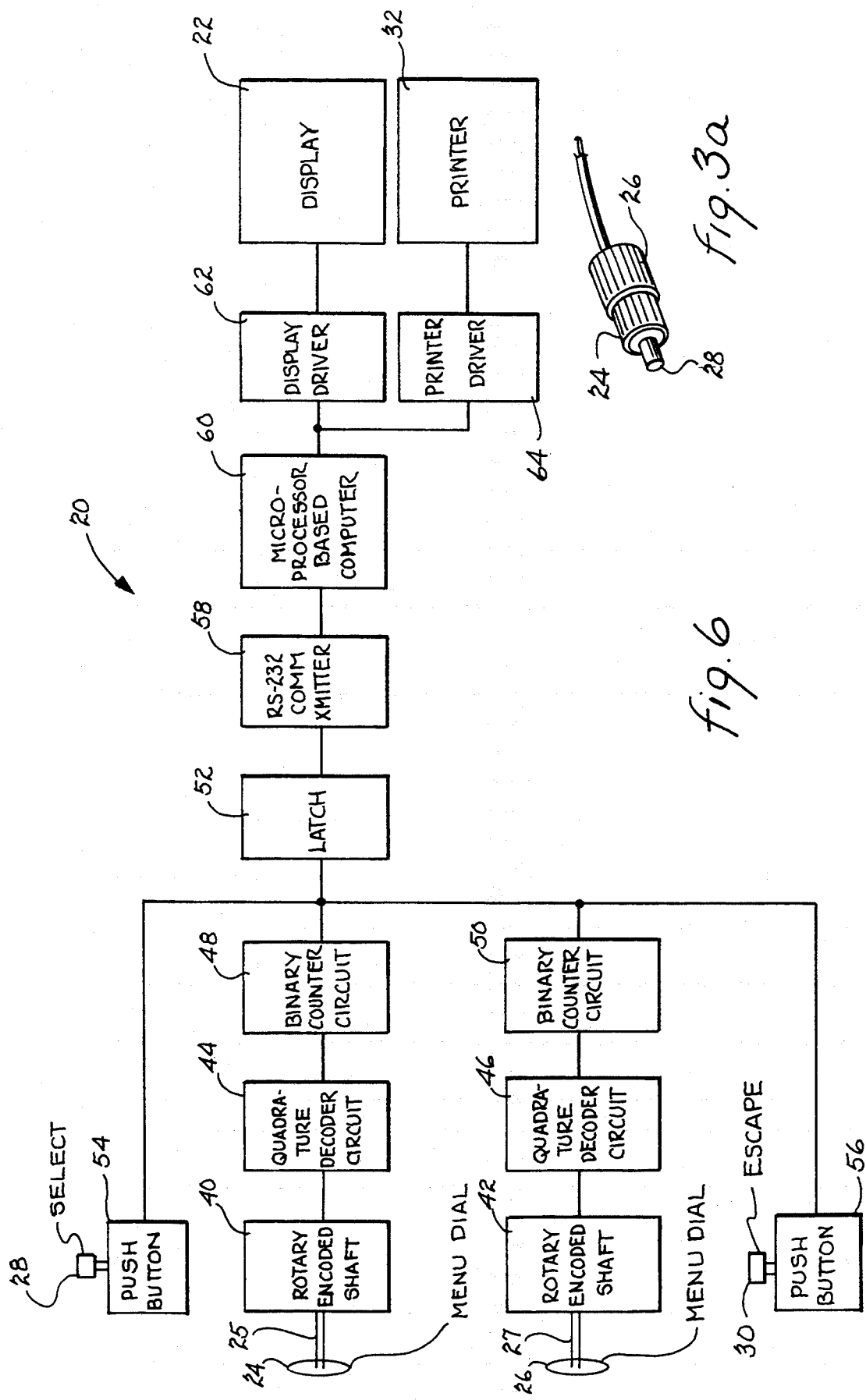

INTERFACE SYSTEM FOR USE WITH MICROPROCESSOR BASED CONTROL SYSTEMS AND METHOD THEREFOR

This is a continuation of application Ser. No. 08/161,582, filed on Dec. 6, 1993, now abandoned.

BACKGROUND OF THE INVENTION

1. Field of the Invention

This invention relates generally to interface systems and, more specifically, to an interface system for use with a microprocessor based control system and a method therefor that provides a compact interface system particularly useful for interacting with a microprocessor based control system in an industrial environment or any other type of harsh operating environment.

2. Description of the Related Art

Prior art systems that permit a user to interface with a microprocessor based control system include push buttons, mouses, trackballs, touchscreens, keyboards, and joysticks. Each of these prior art interfacing systems have certain limitations. In particular, within the petroleum industry, the push button which is the simplest of these prior art interface systems has found the widest application in stand-alone tank monitors despite having several significant disadvantages. For example, as the complexity of the tank monitoring system increases, the number of push buttons required to accommodate all of the tank monitoring system functions also escalates. Consequently, as the quantity of required push buttons expands, the size of the stand-alone tank monitoring system increases, thereby raising the cost of the system. Furthermore, in the typically harsh industrial environment associated with the petroleum industry, push buttons suffer frequent failure when they are exposed to oil, dirt, and other debris. Push button interface systems are also somewhat user unfriendly. For example, in most sophisticated tank monitoring systems, there are a large number of potential functions such as tank level reporting, tank content reporting, and leak detection, and if there is a sizable number of tanks to be monitored, one skilled in the art will appreciate the complex and confusing push button sequences involved in selecting any one of the many possible functions for a tank.

In reference to the other prior art interface schemes, since keyboard interface systems are essentially an array of push buttons, it is not surprising that the shortcomings associated with the use of push button type interface systems in a stand-alone tank monitoring environment are also applicable to keyboard interface systems. Trackball, mouse, and joystick interface schemes rely on the unencumbered motion of a spherical surface over electromechanical transducers in order to drive electrical signals for moving a pointer on a visual display. The pointer is used to select an option from a menu of potential options. Again, the primary problem with these types of interface systems is that dirt, oil, and other debris associated with an industrial work site can collect on the working spherical surface, thereby causing malfunctioning of these systems. Touchscreen interface schemes also present significant drawbacks. For instance, when a user selects a displayed option by reaching out to touch the display screen, the view of the display console is at least partially inhibited. One skilled in the art will understand that in applications such as a tank monitoring system for use in an aircraft, covering the display console is not a prudent action. Moreover, in the petroleum industry and in other industrial applications of stand-alone tank monitoring systems, most users have dirt, oil, or other residue on their hands, therefore, when they touch the display screen to select an option, the debris from their hands is deposited on the screen, and consequently, over a period of time, the view of the screen becomes less clear.

Therefore, there existed a need to provide a rugged, compact, efficient, and user friendly interface system for use with a microprocessor based control system. This new interface system is particularly useful in stand-alone tank monitoring systems that may be found in petroleum manufacturing facilities, fuel stations, and aircraft. Moreover, this system is, in general, an excellent choice as an interface for other aircraft systems such as a navigational computer system due to the stability, space conservation, and flexibility of this new interface system. In addition, this interface system can be used in place of, or in addition to, keyboards, joysticks, mouses, trackballs, and touchscreens as a new type of interface for use with computers such as the personal computer.

SUMMARY OF THE INVENTION

In accordance with one embodiment of this invention, it is an object of this invention to provide a system for interfacing with a microprocessor based control system that presents at least one of a plurality of options for selection on a display.

It is another object of this invention to provide a method for interfacing with a microprocessor based control system that presents at least one of a plurality of options for selection on a display.

It is a further object of this invention to provide a system for interfacing with a microprocessor based control system that is particularly compact, rugged, and user friendly.

It is another object of this invention to provide a system for interfacing with a microprocessor based control system that is used for monitoring the contents of storage tanks.

It is yet another object of this invention to provide a system for interfacing with a microprocessor based control system that is used for monitoring the contents of storage tanks in aircraft.

BRIEF DESCRIPTION OF THE PREFERRED EMBODIMENTS

In accordance with one embodiment of this invention, a system for interfacing with a microprocessor based control system that presents at least one of a plurality of options for selection on a display is disclosed comprising, in combination, first rotatable dial means for providing at least one of a first plurality of inputs to the microprocessor controlled display, second rotatable dial means coupled to the first rotatable dial means for providing at least one of a second plurality of inputs to the microprocessor controlled display, and display means coupled to both the first rotatable dial means and to the second rotatable dial means for displaying an option defined by the combination of at least one of the first plurality of inputs and at least one of the second plurality of inputs. This system further includes selection means coupled to both the first rotatable dial means and to the second rotatable dial means for selecting the option. In addition, this system includes rejection means coupled to both the first rotatable dial means and to the second rotatable dial means for rejecting the option. The first rotatable dial means is coupled to a first rotary encoded shaft means for providing the first plurality of inputs and the second rotatable dial means is coupled to a second rotary encoded shaft means for providing the second plurality of inputs. The first rotary encoded shaft means is coupled to a first quadrature decoder circuit means for determining the direction of rotation of the first shaft and the second rotary encoded shaft is coupled to a second quadrature decoder circuit means for determining the direction of rotation of the second shaft. The first quadrature decoder circuit means is coupled to a first binary counter circuit means for counting the first plurality of inputs and the second quadrature decoder circuit means is coupled to a second binary counter circuit means for counting the second plurality of inputs. Moreover, the first binary counter circuit means, the second binary counter circuit means, the selection means, and the rejection means are coupled to a latch bank means for transferring data from each of the first binary counter circuit means, the second binary counter circuit means, the selection means, and the rejection means via a microprocessor interface to the microprocessor wherein the microprocessor delivers data to a display driver means for driving the display. This system further includes a printer means coupled to the microprocessor for providing hard copy output. Also, if desired, the first rotatable dial means, the second rotatable dial means, and the selection means may be coaxially coupled to a single shaft. In addition, at least one portion of the first plurality of inputs from the first rotatable dial means and at least one portion of the second plurality of inputs from the second rotatable dial means may be used to drive a pointer on the display wherein the pointer is used to point to a desired option being displayed on the display and the selection means is used for selecting the desired option when the pointer is pointing to the desired option. While this interface system has been generally described for use with a microprocessor based control system, it is currently being used with a microprocessor based control system that controls and monitors the operation of storage tanks such as might be found in an industrial facility or an airport. It is understood by those skilled in the art that this interface system could be used in other tank monitoring applications such as in an aircraft.

In accordance with another embodiment of this invention, a method for interfacing with a microprocessor based control system that presents at least one of a plurality of options for selection on a display is provided comprising the steps of providing first rotatable dial means for providing at least one of a first plurality of inputs to the microprocessor controlled display, providing second rotatable dial means coupled to the first rotatable dial means for providing at least one of a second plurality of inputs to the microprocessor controlled display, and providing display means coupled to both the first rotatable dial means and to the second rotatable dial means for displaying an option defined by the combination of at least one of the first plurality of inputs and at least one of the second plurality of inputs. This method further includes the step of providing selection means coupled to both the first rotatable dial means and to the second rotatable dial means for selecting the option. In addition, this method includes the step of providing rejection means coupled to both the first rotatable dial means and to the second rotatable dial means for rejecting the option. The first rotatable dial means is coupled to a first rotary encoded shaft means for providing the first plurality of inputs and the second rotatable dial means is coupled to a second rotary encoded shaft means for providing the second plurality of inputs. The first rotary encoded shaft means is coupled to a first quadrature decoder circuit means for determining the direction of rotation of the first shaft and the second rotary encoded shaft is coupled to a second quadrature decoder circuit means for determining the direction of rotation of the second shaft. In addition, the first quadrature decoder circuit means is coupled to a first binary counter circuit means for counting the first plurality of inputs and the second quadrature decoder circuit means is coupled to a second binary counter circuit means for counting the second plurality of inputs. The first binary counter circuit means, the second binary counter circuit means, the selection means, and the rejection means are coupled to a latch bank means for transferring data from each of the first binary counter circuit means, the second binary counter circuit means, the selection means, and the rejection means via a microprocessor interface to the microprocessor wherein the microprocessor delivers data to a display driver means for driving the display. This method further includes the step of providing a printer means coupled to the microprocessor for providing hard copy output. Also, if desired, this method could include the step of providing the first rotatable dial means, the second rotatable dial means, and the selection means as being coaxially coupled to a single shaft. In addition, if desired, this method can provide at least one portion of the first plurality of inputs from the first rotatable dial means and at least one portion of the second plurality of inputs from the second rotatable dial means to be used to drive a pointer on the display wherein the pointer is used to point to a desired option being displayed on the display and the selection means is used for selecting the desired option when the pointer is pointing to the desired option.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 3a is a perspective view of two control dials and a selection push button coaxially coupled to a single axis that can be integrated into the new system used to interface with a microprocessor based control system.

FIG. 6 is a simplified block diagram of the new system used to interface with a microprocessor based control system.

DESCRIPTION OF THE PREFERRED EMBODIMENTS

Figure 1:
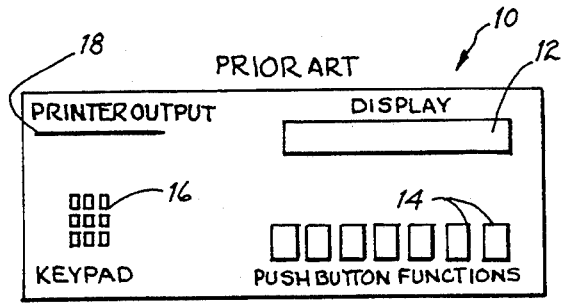
FIG. 1 is a view of a prior art operating panel used for interfacing with a microprocessor controlled tank monitoring system.

FIG. 1 shows a prior art operating panel 10 that is used for interfacing with a microprocessor controlled tank monitoring system. The prior art operating or interfacing panel 10 includes a display 12, a plurality of push buttons 14, a keypad 16, and a printer output 18 A user of this prior art system 10 would input a desired function such as a tank level report via the push buttons 14, and the display 12 would show the currently requested function. The keypad 16 would then be used to select a particular tank or to input other data that might be requested by the display 12. The printer 18 provides hard copy output when it is desired.

Figure 2:
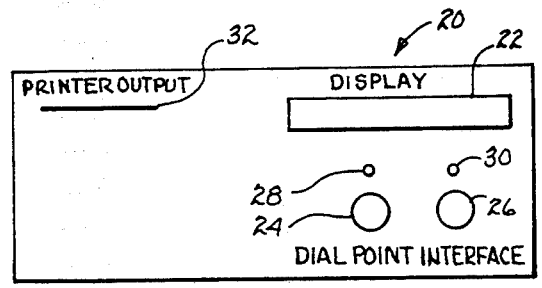
FIG. 2 is a simplified view of a new operating panel used for interfacing with a microprocessor controlled tank monitoring system.

Referring to FIG. 2, one embodiment of the new operating panel used for interfacing with a microprocessor controlled tank monitoring system is shown. This new interfacing system is generally designated by reference number 20. The operating panel of the new interface system 20 comprises a display 22, dials 24 and 26, push buttons 28 and 30, and a printer output 32.

Figure 3:
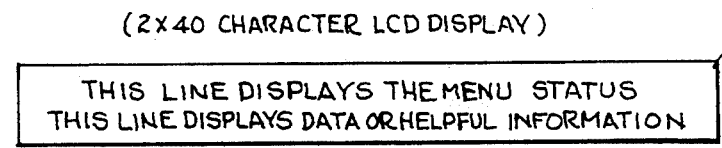
FIG. 3 is an enlarged view of a portion of the new operating panel from FIG. 2 showing one configuration of the operating dials.

FIG. 3 shows an enlarged view of a portion of the operating panel of the interface system 20. As the menu dial 26 is rotated, each of the plurality of possible menu options is displayed one at a time on the top line of the display 22. Similarly, when the tank dial 24 is rotated, each of the plurality of tanks or other display data are displayed one at a time on the bottom line of the display 22. Although the display 22 in this embodiment of the interface system 20 is a 2×40 character LCD display, it will be understood by those skilled in the art that other sizes and types of displays may be implemented with this system 20 if desired.

By using two dials 24 and 26, as opposed to a complex sequence of push button operations, to select an option, this new interface system 20 is particularly user friendly. A user can quickly review all of the first level menu options by simply rotating the menu dial 26 until the menu options repeat themselves, thereby indicating that all of the first level menu options have been displayed. Analogously, all of the tank and/or data options can be reviewed by simply rotating the tank dial 24 until the options repeat themselves. When the tank dial 24 is in the correct position to select and display the desired tank or data, and when the menu dial 26 is in the correct position to select and display the desired menu choice, a user presses the select push button 28 to select this menu option that is defined by the selected choice from both dials 24 and 26. The action associated with the desired menu option is executed once the select push button 28 is pressed.

Note that selecting a first level menu option defined by the displayed choices associated with the dials 24 and 26 can provide a second level of menu options. In a similar manner, selection of a second level menu option can lead to a third level of menu options. In general, by rotating the menu dial 26 when the system 20 is at the first level of menu options, one can visualize a plurality of first level menu options provided across an imaginary horizontal line. It follows then that selecting a first level menu option that has a plurality of sub-menus, one can visualize these sub-menus provided across a second level imaginary horizontal line lower than the first. It becomes apparent that, in general, any number of levels of sub-menus may be added to the first level menu, thereby forming a complex root-like logical structure of menu and sub-menu options. To further enhance the versatility of this system 20, the specific functions of the dials 24 and 26 and the push buttons 28 and 30 may change with the shift from one menu to another. Pressing the escape push button 30 permits the user to reject or escape from one sub-menu to the parent menu which is the next menu located up the logical structure of menu options.

Referring to FIG. 3a, the tank dial 24, the menu dial 26, and the select push button 28 are coaxially coupled to a single shaft. An escape push button 30 (not shown) would also be provided, preferably in close proximity to this arrangement to further conserve operating panel space. The interface system 20 with the arrangement of the tank dial 24, the menu dial 26, and the select push button 28 as shown in FIG. 3a in conjunction with an escape push button 30 and a display 22 operates in a similar manner to the arrangement of the system described in FIG. 3. It will by understood by those skilled in the art that alternate coaxial configurations may be used such as having dials 24 and 26 coaxially coupled to a single shaft, and instead of having to push the select push button 28 to make a selection, one can push or pull the shaft itself in order to make a selection.

Figure 4:
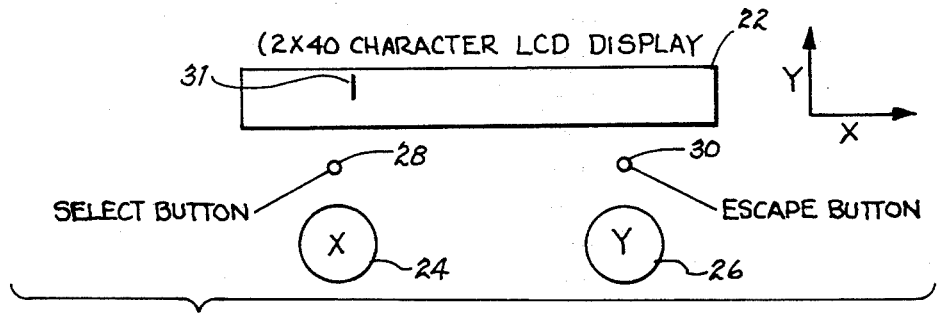
FIG. 4 is an enlarged view of a portion of the new operating panel from FIG. 2 showing another possible configuration of the operating dials.

Referring to FIG. 4, an example of a sub-menu option is shown in which the functions of the dials 24 and 26 have changed. In this sub-menu option, the tank dial 24 and the menu dial 26 have been transformed into an X dial 24 and a Y dial 26. Rotation of the X dial 24 moves the pointer 31 either to the left or to the right along the X-axis while rotation of the Y dial 26 moves the pointer 31 either up or down along the Y-axis. In this sub-menu, the pointer 31 can be moved around the screen to point to a menu option which is selected by pressing the select push button 28. Selecting one option from this type of sub-menu can display yet another level of sub-menu options, therefore, the escape push button 30 is used to back out of a sub-menu to the parent menu. Note that in this embodiment of the interface system 20, an expanded display 22 is particularly advantageous.

Figure 5:
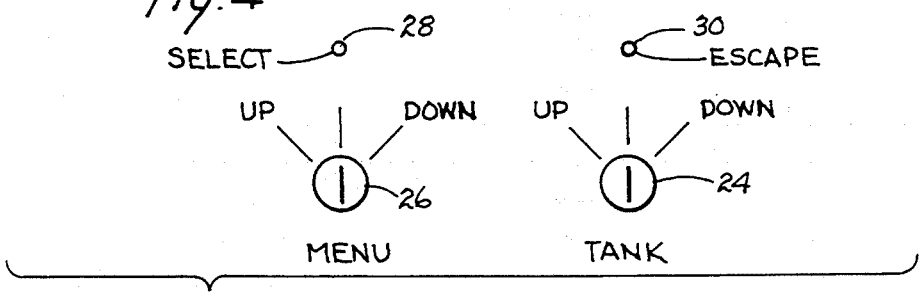
FIG. 5 is an enlarged view of a portion of the new operating panel from FIG. 2 showing yet another possible configuration of the operating dials.

Referring to FIG. 5, another embodiment of the operating panel for the new interface system 20 is shown. This embodiment of the interface system 20 comprises a display 22, a tank dial 24, a menu dial 26, a selection push button 28, an escape push button 30, and a printer output 32 much like the embodiment shown in FIGS. 2-4. Rather than having fully rotatable dials 24 and 26 like those shown in FIGS. 2-4, the embodiment shown in FIG. 5 is provided with two 3-position dials, namely the menu dial 26 and the tank dial 24. This embodiment of the interface system 20 operates essentially in the same manner as previously described for the embodiment shown in FIGS. 2-4. One difference is the use of the 3-position dials 24 and 26. In the up position of each of the dials 24 and 26, the options associated therewith are displayed one at a time from the first to the last option, and in the down position of each of the dials 24 and 26, the options associated therewith are displayed one at a time in the opposite order. The third position of the dials 24 and 26 is the null position which stops the display on the current option associated with the dial that is in the null position.

Referring to FIG. 6, a simplified block diagram is shown to demonstrate the implementation of each of the embodiments shown in FIGS. 2-5 of the interface system 20. The tank dial 24 is coupled to a rotary encoded shaft 40 via the shaft 25. The output of the rotary encoded shaft 40 is coupled to the input of the quadrature decoder circuit 44, and the output of the quadrature decoder circuit 44 is coupled to an input of the binary counter circuit 48. Rotary encoded shafts 40, quadrature decoder circuits 44, and binary counter circuits 48 are well known to those skilled in the art. The rotary encoded shaft 40 includes a disc with a first group of slots located circumferentially around the disc and an optical transmitter/receiver pair such that the rotation of the disc causes a plurality of pulses to be output from the rotary encoded shaft 40. In addition, the rotary encoded shaft 40 has a second group of slots located circumferentially around the disc and a second optical transmitter/receiver pair such that the rotation of the disc causes a second plurality of pulses to be output from the rotary encoded shaft 40. The quadrature decoder circuit 44 receives both groups of pulses from the rotary encoded shaft 40, and subsequently, determines the direction of rotation of the tank dial 24. The output signal from the quadrature decoder circuit 44 informs the binary counter circuit 48 which direction the tank dial 24 is being rotated, and the counter circuit 48 counts up or down, depending on the direction of rotation of the tank dial 24, to provide an output count signal that corresponds to the position of the tank dial 24. In a similar manner, the shaft 27, the rotary encoded shaft 42, the quadrature decoder circuit 46, and the binary counter circuit 50 operate to define the position of the menu dial 26. The select push button 28 is coupled to the select push button circuit 54 that outputs signals that define the position of the select push button 28, and the escape push button 30 is coupled to the escape push button circuit 56 that outputs signals that define the position of the escape push button 30.

The output signals from the select push button circuit 54, the binary counter circuits 48 and 50, and the escape push button circuit 56 are input to the latch bank 52 which maintains the position status of the select push button 28, the tank dial 24, the menu dial 26, and the escape push button 30. The output signals from the latch bank 52 are input to a microprocessor based computer 60 such as an INTEL 386 or 486 based computer via a communications transmitter 58 such as the RS-232. Output signals from the microprocessor based computer 60 control various drivers such as the display driver 62 and the printer driver 64, and the drivers 62 and 64 drive the display 22 and the printer 32, respectively.

OPERATION

Again referring to FIG. 6, the quadrature decoder circuit 44 receives both groups of pulses from the rotary encoded shaft 40, and subsequently, determines the direction of rotation of the tank dial 24. The output signal from the quadrature decoder circuit 44 informs the binary counter circuit 48 which direction the tank dial 24 is being rotated, and therefore, the counter circuit 48 counts up or down, depending on the direction of rotation of the tank dial 24, to provide an output count signal that corresponds to the position of the tank dial 24. In a similar manner, the rotary encoded shaft 42, the quadrature decoder circuit 46, and the binary counter circuit 50 operate to define the position of the menu dial 26. The select push button 28 is coupled to the select push button circuit 54 that outputs signals that define the position of the select push button 28, and the escape push button 30 is coupled to the escape push button circuit 56 that outputs signals that define the position of the escape push button 30. The output signals from the select push button circuit 54, the binary counter circuits 48 and 50, and the escape push button circuit 56 are input to the latch bank 52 which maintains the position status of the select push button 28, the tank dial 24, the menu dial 26, and the escape push button 30. The output signals from the latch bank 52 are input to a microprocessor based computer 60 via a communications transmitter 58. Output signals from the microprocessor based computer 60 control various drivers such as the display driver 62 and the printer driver 64, and the drivers 62 and 64 drive the display 22 and the printer 32, respectively.

As previously mentioned, the interface system 20 is particularly well suited for operation with a stand alone tank monitoring system as might be found in a petroleum manufacturing facility, a fuel station, or an aircraft, however, this system 20 can also be used as a replacement for, or in the alternative, as a supplement to a keyboard, a mouse, or other interface system used with a computer. Therefore, while the system 20 has been specifically described for use with a stand alone tank monitoring system, one skilled in the art will understand that this new interface system 20 while interacting with a computer system such as a personal computer may execute any software application loaded into the computer.

The following description of the operation of the interface system 20 with a stand-alone tank monitoring system is provided as an example to further demonstrate the capabilities of this system 20.

Menu #1

In menu #1, a user can receive a "quick-dip" hard copy report for any single tank or for each tank being monitored. The "quick-dip" print report can show, for example, volume, level, temperature, time and date of the report, and fuel type for a desired tank. The menu dial 26 is rotated until menu #1 is shown in the display 22. To select the desired tank, the tank dial 24 is rotated to display the desired tank. Once menu #1 and the desired tank are displayed, the select push button 28 is depressed to initiate a "quick-dip" hard copy report of the aforementioned data. In menu #1, the display 22 will show the leak detect status (LD=ON or LD=OFF) of the desired tank. When leak detect is on, the tank monitoring system automatically monitors the level of the desired tank to determine and report if a leak should occur in the tank. Alternatively, when the leak detect is off, the leak monitoring feature is disabled. After approximately 60 seconds in any other menu without performing any action, the system 20 will return the display 22 to menu #1.

Menu #2

In menu #2, a user can receive various hard copy reports for any single tank or for each tank being monitored. The print reports can show, for example, a leak detect report, a delivery report, or an extraction report for a desired tank. The menu dial 26 is rotated until menu #2 is shown in the display 22. To select the desired tank, the tank dial 24 is rotated to display the desired tank. Once menu #2 and the desired tank are displayed, the select push button 28 is depressed. At this point, the display 22 prompts the user to select a particular print report via the use of the menu dial 26 and the select push button 28.

Menu #3

In menu #3, the user can place one or more tanks into the leak detect mode. The menu dial 26 is rotated to display the leak detect menu, and then the desired tank is displayed by rotating the tank dial 24. Next the select push button 28 is depressed to place the displayed tank into the leak detect mode, and when one desires to take the tank out of the leak detect mode, the select push button 28 is depressed again.

Menu #4

In menu #4, the user can place one or more tanks into the delivery or the extraction monitoring mode. In the delivery mode, the system 20 monitors the amount of fluid added to a tank selected for filling, and in the extraction mode, the system 20 monitors the amount of fluid removed from an on service tank. The menu dial 26 is rotated to display menu #4, and then the desired tank is displayed by rotating the tank dial 24. At this point, the user depresses the select push button 28. The display 22 will prompt the user to select between the delivery mode or the extraction mode. Assuming the delivery mode is desired, the menu dial 26 is rotated until the display 22 indicates the delivery mode, then the select push button 28 is depressed to prepare the system 20 for receipt of fluid into the selected delivery tank. After the delivery is completed, the select push button 28 is again depressed to take the system 20 out of the delivery mode. The select push button 28 is depressed yet again to prompt the system 20 to print out a hard copy delivery report. Note that more than one tank may be in either the delivery or the extraction mode at any time. Menu #3 does not automatically revert back to menu #1 after 60 seconds of inaction.

Menu #5

The interface system 20 can continuously monitor one or more tanks for a plurality of alarm conditions such as high tank fluid level, low tank fluid level, and high tank water content. When any of these or other alarm conditions are detected by sensors external to the system 20, these external devices send alarm signals to the system 20 which results in the sounding of an audible alarm. The system 20 will automatically display menu #5 when an alarm condition exists. The user silences the alarm by depressing the select push button 28, and in addition, pressing the push button 28 causes an alarm report to be shown on the display 22 and printed from the printer 32. All alarm conditions that have not been corrected are stored by the system 20 according to the affected tank so that when any information is reported via the display 22 or the printer 32 regarding the affected tank, the user is reminded of the problem.

Menu #6

The system 20 date and time are set and displayed in menu #6. The menu dial 26 is rotated to display menu #6 which is selected by depressing the select push button 28. Once in menu #6, the characters to be changed begin to flash. By rotating the tank dial 24, the user can select which character is to be changed, and then the menu dial 26 is rotated until the proper value for the selected character is displayed. In this manner, the user sets the proper value for each character in the display 22.

Menu #7

In menu #7, the user can receive a hard copy report of various tank data. The user rotates the tank dial 24 and the menu dial 26 until the desired tank and menu #7 are displayed. After depressing the select push button 28 to enter this menu, the user can select the particular data for the hard copy report by rotating the menu dial 26 and entering the selections by depressing the select push button 28.

Menu #8

The user rotates the tank dial 24 and the menu dial 26 until the desired tank and menu #8 are displayed, and then depressing the select push button 28 causes the tank dial 24 and the menu dial 26 to become the X dial 24 and the Y dial 26 via dial function transformation means. In this configuration of the dials 24 and 26, the user can drive the pointer 31 (see FIG. 4) on the display 22 and select options from the display 22 by depressing the select push button 28.

While the invention has been particularly shown and described with reference to the preferred embodiments thereof, it will be understood by those skilled in the art that the foregoing and other changes in form and details may be made therein without departing from the spirit and scope of the invention. For example, this dial based interface system could be substituted for push button, mouse, trackball, touchscreen, keyboard, and joystick interface systems found in most personal computer systems. In addition, dials having mechanical detentes could be used if desired to help a user stop the dials at preselected points. It will be understood by those skilled in the art that as software and displays are advanced, three-dimensional representations can become needed, and consequently, if desired, three dials could be used to interface with such three-dimensional representations.

What is claimed is:

1. A system for interfacing with a microprocessor based control system that presents at least one of a plurality of options for selection on a display comprising, in combination:

first rotatable dial means for providing at least one of a first plurality of inputs to said microprocessor controlled display;

second rotatable dial means coupled to said first rotatable dial means for providing at least one of a second plurality of inputs to said microprocessor controlled display;

display means coupled to both said first rotatable dial means and to said second rotatable dial means for displaying one of said options defined by the combination of at least one of said first plurality of inputs and at least one of said second plurality of inputs;

single selection means coupled to both said first rotatable dial means and to said second rotatable dial means for selecting any one of said options after preselecting a position for said first rotatable dial means and said second rotatable dial means;

dial function transformation means comprising at least one of said options for changing said first rotatable dial means to an X direction dial and for changing said second rotatable dial means to a Y direction dial for moving a pointer on said display means to another option displayed on said display means for selection by said single selection means;

rejection means coupled to both said first rotatable dial means an to said second rotatable dial means for rejecting said option;

said first rotatable dial means being coupled to a first rotary encoded shaft means for providing said first plurality of inputs and said second rotatable dial means being coupled to a second rotary encoded shaft means for providing said second plurality of inputs;

said first rotary encoded shaft means being coupled to a first quadrature decoder circuit means for determining the direction of rotation of a shaft of said first rotary encoded shaft means and said second rotary encoded shaft means being coupled to a second quadrature decoder circuit means for determining the direction of rotation of a shaft of said second rotary encoded shaft means;

said first quadrature decoder circuit means being coupled to a first binary counter circuit means for counting said first plurality of inputs and said second quadrature decoder circuit means being coupled to a second binary counter circuit means for counting said second plurality of inputs;

said first binary counter circuit means, said second binary counter circuit means, said single selection means, and said rejection means being coupled to a latch bank means for transferring data from each of said first binary counter circuit means, said second binary counter circuit means, said single selection means, and said rejection means via a microprocessor interface to said microprocessor, said microprocessor delivering data to a display driver means for driving said display means; and printer means coupled to said microprocessor for providing hard copy output.

2. The system of claim 1 wherein said first rotatable dial means, said second rotatable dial means, and said single selection means are coaxially coupled to a single shaft.

3. A method for interfacing with a microprocessor based control system that presents at least one of a plurality of options for selection on a display comprising the steps of:

providing first rotatable dial means for providing at least one of a first plurality of inputs to said microprocessor controlled display;

providing second rotatable dial means coupled to said first rotatable dial means for providing at least one of a second plurality of inputs to said microprocessor controlled display;

providing display means coupled to both said first rotatable dial means and to said second rotatable dial means for displaying one of said options defined by the combination of at least one of said first plurality of inputs and at least one of said second plurality of inputs;

providing single selection means coupled to both said first rotatable dial means and to said second rotatable dial means for selecting any one of said options after preselecting a position for said first rotatable dial means and said second rotatable dial means;

providing dial function transformation means comprising at least one of said options for changing said first rotatable dial means to an X direction dial and for changing said second rotatable dial means to a Y direction dial for moving a pointer on said display means to another option displayed on said display means for selection by said single selection means;

providing rejection means coupled to both said first rotatable dial means and to said second rotatable dial means for rejecting said option;

providing said first rotatable dial means being coupled to a first rotary encoded shaft means for providing said first plurality of inputs and said second rotatable dial means being coupled to a second rotary encoded shaft means for providing said second plurality of inputs;

providing said first rotary encoded shaft means being coupled to a first quadrature decoder circuit means for determining the direction of rotation of a shaft of said first rotary encoded shaft means and said second rotary encoded shaft means being coupled to a second quadrature decoder circuit means for determining the direction of rotation of a shaft of said second rotary encoded shaft means;

providing said first quadrature decoder circuit means being coupled to a first binary counter circuit means for counting said first plurality of inputs and said second quadrature decoder circuit means being coupled to a second binary counter circuit means for counting said second plurality of inputs;

providing said first binary counter circuit means, said second binary counter circuit means, said single selection means, and said rejection means being coupled to a latch bank means for transferring data from each of said first binary counter circuit means, said second binary counter circuit means, said single selection means, and said rejection means via a microprocessor interface to said microprocessor, said microprocessor delivering data to a display driver means for driving said display means; and providing printer means coupled to said microprocessor for providing hard copy output.

4. The method of claim 3 wherein said first rotatable dial means, said second rotatable dial means, and said single selection means are coaxially coupled to a single shaft.

* * * * *